US011038745B1

(12) United States Patent
Vasquez et al.

(10) Patent No.: US 11,038,745 B1
(45) Date of Patent: Jun. 15, 2021

(54) RAPID POINT OF PRESENCE FAILURE HANDLING FOR CONTENT DELIVERY NETWORKS

(71) Applicant: Amazon Technologies, Inc., Seattle, WA (US)

(72) Inventors: Jorge Peixoto Vasquez, Mercer Island, WA (US); Philippe Cheng, Bellevue, WA (US); Komei Nakamoto, Kirkland, WA (US); Nivetha Veluchamy, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/835,829

(22) Filed: Mar. 31, 2020

(51) Int. Cl.
*G06F 13/00* (2006.01)
*H04L 12/24* (2006.01)
*H04L 12/707* (2013.01)
*H04L 12/703* (2013.01)
*H04L 29/12* (2006.01)

(52) U.S. Cl.
CPC .......... *H04L 41/0654* (2013.01); *H04L 45/24* (2013.01); *H04L 45/28* (2013.01); *H04L 61/2007* (2013.01)

(58) Field of Classification Search
CPC . H04L 41/0654; H04L 45/24; H04L 61/2007; H04L 45/28
USPC .......... 709/239, 238, 245, 224, 223
See application file for complete search history.

(56) References Cited

U.S. PATENT DOCUMENTS

| 9,369,371 B2 * | 6/2016 | Filsfils | H04L 43/50 |
| 9,882,796 B2 * | 1/2018 | Ariga | H04L 41/5019 |
| 10,237,163 B2 * | 3/2019 | Jacob | H04L 45/66 |
| 2014/0269266 A1 * | 9/2014 | Filsfils | H04L 43/50 370/228 |
| 2015/0381449 A1 * | 12/2015 | Ariga | H04L 43/0852 370/241 |
| 2017/0195210 A1 * | 7/2017 | Jacob | H04L 45/74 |

* cited by examiner

*Primary Examiner* — Kenneth R Coulter
(74) *Attorney, Agent, or Firm* — Nicholson De Vos Webster & Elliott, LLP

(57) ABSTRACT

Techniques for rapid point of presence failure handling for a content distribution network are described. A traffic management service collects network traffic utilization information from multiple POPs and, together with POP capacity information, identifies one or multiple other failover POPs that can accommodate the traffic of a particular POP in the event of its failure. The service can cause routers of these POPs to advertise redundant routes to neighboring edge devices such that the redundant routes are only used in the event of a detected failure of the primary POP.

20 Claims, 9 Drawing Sheets

RAPID POINT OF PRESENCE FAILURE HANDLING FOR CONTENT DELIVERY NETWORKS

BACKGROUND

Computing devices typically utilize one or more communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf of, or for the benefit of, the general public.

Existing routing and addressing technologies can enable multiple data centers to provide similar or identical content to client computing devices. In some instances, each data center providing a set of content may be referred to as a point-of-presence (POP) of a content delivery system (or other organization) providing the content. Content delivery systems (sometimes referred to as "content delivery networks" or "CDNs") often attempt to connect users to a geographically "nearby" (to the user) POP, as such connections are commonly much faster than connections between the user and geographically-distant POPs or other computing systems. Accordingly, a CDN may implement POPs over a wide area—e.g., worldwide—and route requests for content to "nearby" POPs for fulfillment. For example, a CDN customer may host a set of files (often referred to as a "distribution") for a web page through the CDN. The CDN replicates ones or all of the set of files for the web page in potentially many locations, such as in a POP in Tokyo and another POP in London so that a user in the United Kingdom would be served the web page from the London POP while a user in Japan would be served the web page from the Tokyo POP.

Each POP may be associated with an address on a computing network, such as an Internet Protocol (IP) address. However, requests for content are generally addressed to a human-readable identifier, such as a universal resource identifier (URI) or domain name. To enable use of human-readable identifiers in accessing content, a client computing device can interact with a Domain Name System (DNS) that operates to resolve a domain name into a corresponding network address (e.g., an IP address). Typically, a CDN is associated with one or more domain names, and an operator of CDN will have authority to alter DNS records specifying IP addresses to which those domain names resolve. Thus, the operator of a CDN can utilize DNS records to control how requests to access content of the CDN are routed to POPs.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for rapid point of presence (POP) failure handling for content delivery networks (CDNs). According to some embodiments, one or more routes for network addresses utilized by a first POP are advertised from one or more other POPs as "redundant routes" in a manner such that the original routes will continue to be used by other network devices, and thus the traffic will continue to flow to the first POP. Upon a failure event associated with the first POP, such as a network connectivity issue, the other network devices can quickly shift the affected traffic to other POPs based on knowledge of the redundant routes. In some embodiments, traffic for the network addresses can be intelligently sent to different POPs in the event of a failure to avoid creating cascading failures that may otherwise result from overwhelming these POPs. Moreover, embodiments can allow for clients who have already resolved a network address for a resource to continue using that network address despite an intervening failure in the POP that was supposed to serve that resource, and embodiments can allow for quick and near-seamless decommissioning of a POP without significantly affecting customer traffic. Further, in some embodiments, upon the failure event being resolved, the system can self-heal and quickly begin to route traffic associated with affected network addresses back to the original POP.

Figure 1:
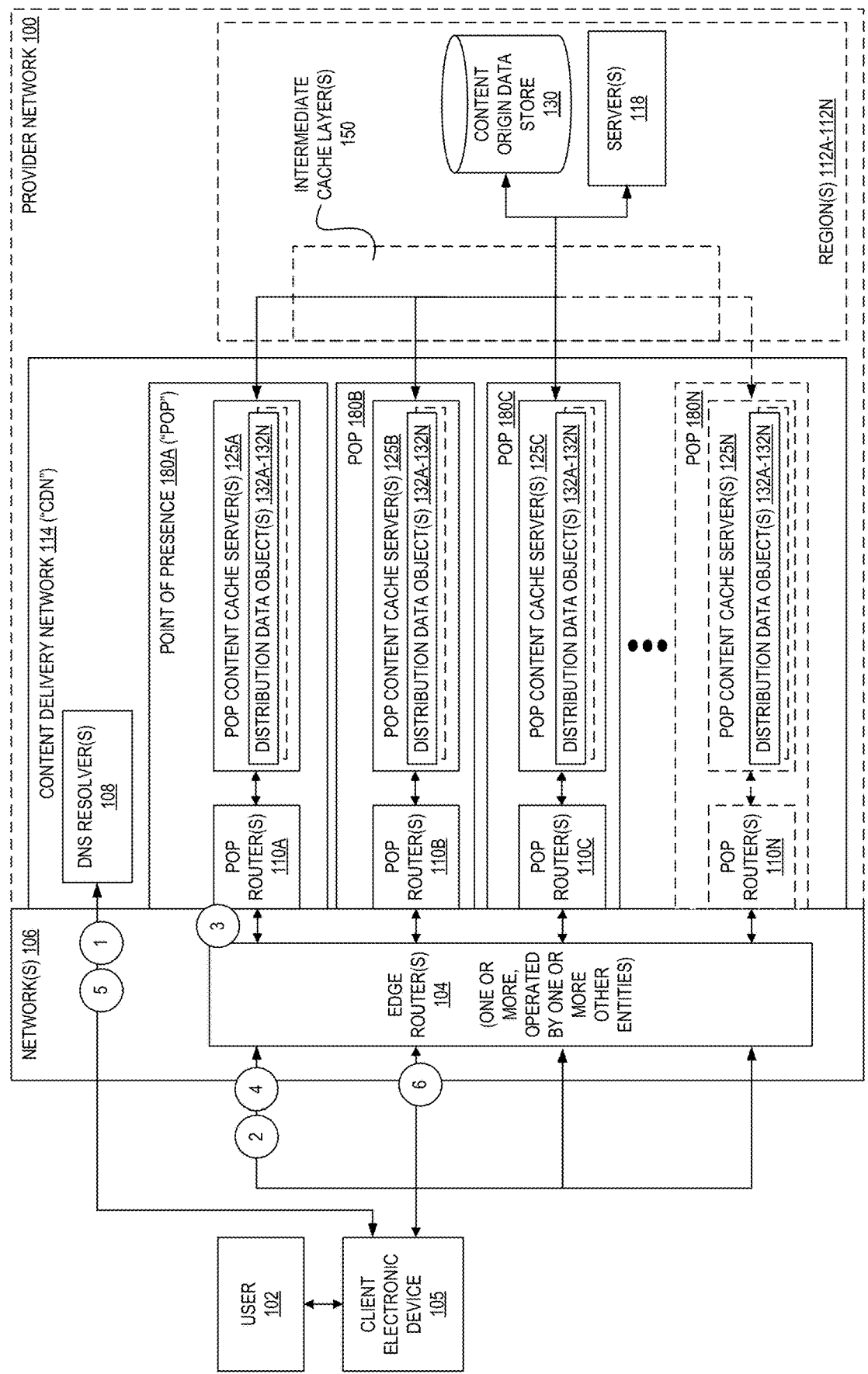
FIG. 1 is a diagram illustrating an environment including point of presence (POP) locations for content provider networks (CDNs) according to some embodiments.

FIG. 1 is a diagram illustrating an environment including POP locations for CDNs according to some embodiments. In FIG. 1, a CDN 114 is illustrated that includes multiple geographically distributed point of presence (POP) 180A-180N locations including POP routers 110A-110N and POP content cache servers 125A-125N, which provide high availability and performance by distributing a service or computing resources spatially relative to end users 102. The POPs 180A-180N may cache and provide access to data objects 132A-132N (e.g., files, other data structures, etc.) of one or more content "distributions" to thereby act as a "front-end" to computing resources at another location, e.g., data objects from a content origin data store 130, server(s) 118, etc., which may be implemented in one or more regions 112A-112N of a provider network 100.

In some embodiments, the CDN 114 may be offered by or in connection with a provider network 100 and implement aspects of a DNS service. A DNS service may be, for example, a highly-available and scalable cloud DNS web service that gives developers and organizations a reliable way to route end users to Internet applications by translating domain names, via one or more DNS resolvers 108, into the numeric network addresses that computing systems use to connect to each other. The DNS service may be an authoritative DNS service that can operate to connect user requests to infrastructure running in the provider network 100, such as compute instances of a hardware virtualization service, virtual load balancers, object stores, etc., and may be used to route users to infrastructure inside or outside of the provider network 100. The DNS service may also implement DNS health checks to route traffic to healthy endpoints or to independently monitor the health of applications and its endpoints. A DNS service may also manage traffic globally through a variety of routing scheme types, including latency-based routing, Geo DNS, geo-proximity, round robin, weighted round robin, etc., which can be combined with DNS failover techniques in order to enable a variety of low-latency, fault-tolerant architectures. Aspects of a DNS service—such as DNS resolvers 108—can be implemented according to a variety of architectures, and thus may be implemented within A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, CDNs, Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internal via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can include a physical network (e.g., sheet metal boxes, cables) referred to as the substrate. The cloud provider network can also include an overlay network of virtualized computing resources that run on the substrate. As such, network packets can be routed along a substrate network according to constructs in the overlay network (e.g., virtual private networks, virtual firewalls, and the like). A mapping service can coordinate the routing of these network packets. The mapping service can be a regional distributed look up service that maps the combination of overlay Internet Protocol (IP) address and network identifier to a substrate IP address so that the distributed substrate computing devices can look up where to send packets.

To illustrate, each physical host can have an IP address in the substrate network. Hardware virtualization technology can enable multiple operating systems to run concurrently on a host computer, for example as VMs on the host. A hypervisor, or virtual machine monitor (VMM), on a host allocates the host's hardware resources amongst various VMs on the host and monitors the execution of the VMs. Each VM may be provided with one or more IP addresses in the overlay network, and the VMM on a host may be aware of the IP addresses of the virtual machines on the host. The VMMs (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., public IP addresses) to substrate IP addresses (e.g., private IP addresses), which can be accessed by various processes on the cloud provider network for routing packets between endpoints.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

In some embodiments, a cloud provider network is formed as a number of regions, where a region is a geographical area in which the cloud provider clusters data centers. Each region includes multiple (e.g., two or more) availability zones (AZs) connected to one another via a private high-speed network, for example a fiber communication connection. An AZ provides an isolated failure domain including one or more data center facilities with separate power, separate networking, and separate cooling from those in another AZ. AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network). Transit Centers (TC) are the primary backbone locations linking customers to the cloud provider network and may be co-located at other network provider facilities (e.g., Internet service providers, telecommunications providers). Each region can operate two or more TCs for redundancy.

Figure 2:
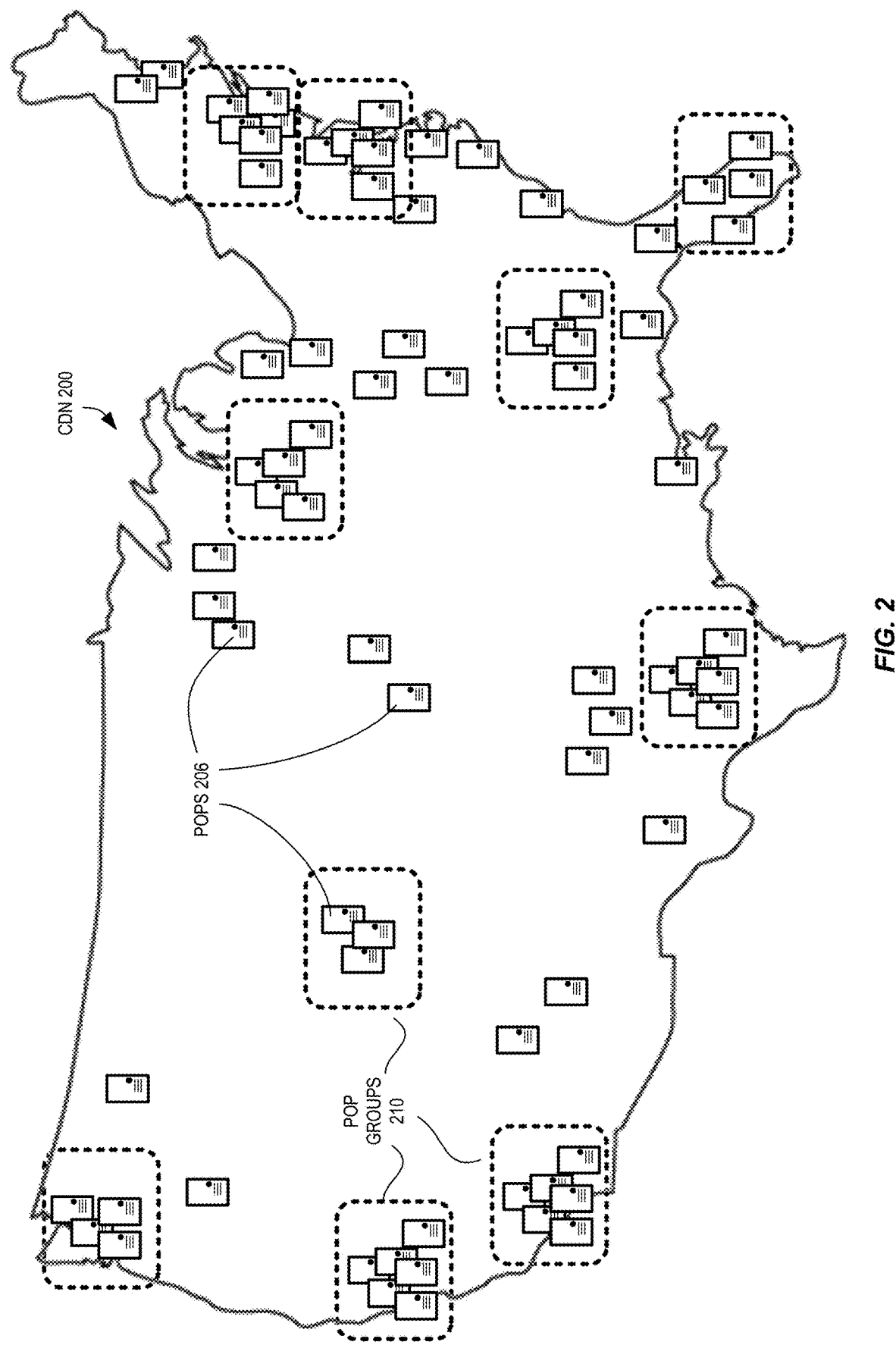
FIG. 2 illustrates an exemplary cloud provider network including geographically dispersed POPs according to some embodiments.

As shown, a provider network 100 includes one or more POPs 180A-180N to facilitate content distribution by caching content in the form of distribution data objects 132A-132N closer to end-users. POPs 180A-180N, which may be referred to as one type of "edge location" of the provider network 100, are typically geographically dispersed across cities, states, geographic areas, countries, etc. For example, FIG. 2 illustrates an exemplary CDN 200 including geographically dispersed POPs 206 according to some embodiments. As illustrated, FIG. 2 includes a map of the United States and surrounding areas overlaid with multiple POPs 206, though it is to be understood that POPs may be deployed differently than as shown, in different locations, etc., and thus this illustration is exemplary. The CDN 200, in some embodiments, may be a service of a cloud provider network and/or act as a frontend to resources within the cloud provider network.

In comparison to the number of regional data centers or availability zones, the number of POPs 206 can be much higher. Such widespread deployment of POPs can provide low-latency connectivity to resources (e.g., files, streams, etc.) for a much larger group of end user devices (in comparison to those that happen to be very close to a regional data center). In some embodiments, each POP 206 location can be peered to some portion of the cloud provider network 200 (e.g., a parent availability zone or regional data center). Such peering allows the various components operating in the cloud provider network 200 to manage the compute resources of the POP location, and/or for the POP to have rapid and easy connectivity to the resources of the provider network. In some embodiments, a number of POPs 206 (e.g., two or more POPs) may make up a POP group 210, typically when they share connectivity and/or geographic similarities such that they each provide a relatively same level of service (e.g., latency) to end users in a geographic area.

Turning back to FIG. 1, customers of the provider network may host their content within the provider network (e.g., files or data objects) or distribute their content through the provider network (e.g., multimedia streams). The customers may thus configure "distributions" of content to be made available through a CDN 114, allowing the provider network to facilitate the distribution of that content to the customer's users 102 through use of the POPs 180A-180N. Thus, a user's 102 request for content (originated by a user's client electronic device 105) may be routed across one or more networks 106 (e.g., via switches, routers 104, and the like) to a POP router 110A-110N of a POP (e.g., POP 180A) that is geographically proximate to the source of the request (that is, the client), and thereafter to one or more POP content cache servers 125 that may fulfill the request from content cached within the POP (e.g., distribution data objects 132A-132N), when available, or obtain the content from a source of the content. In some embodiments, multiple POPs may be in a same geographic area, e.g., scattered around a city, state, collection of cities, or geographic region, and thus several POPs may all be "near" a client.

For example, the POP content cache server(s) (e.g., 125A) at a POP (e.g., 180A) may implement a multi-tier cache, in which a request is provided to a "level 1" cache server 125 having access to a small, fast cache of "hot" distribution data object resources of typically many different distributions. In some embodiments, these "level 1" cache resources may be kept in sync among multiple different "level 1" cache servers. If a requested data object resource is not available in this cache (e.g., due to not having been recently requested, or not being requested in a recent amount of time by a relatively large number of clients), the request may be sent to a "level 2" cache server 125 having comparatively more data object storage. If the requested distribution data object is found in this level two cache (or set of caches), it may be returned; otherwise, if the requested data object is still not found, the request may continue on to another cache server 125 that manages connections back to sources of data objects, e.g., to another one or more layers of intermediate cache 150 that optionally may be implemented within a region 112 of the provider network 100, and/or to one or more content data stores 130 and/or server(s) 118, to thus retrieve the data object.

POPs 180 thus represent geographically dispersed portions of the provider network 100, each capable of serving cached distribution data object content to end-users. Such content can include, for example, the web site of a customer of the operator of the provider network 100, a set of audiovisual files, streamed content, etc. For example, Company A can host its website—www.companya.com—from the provider network 100. The website content, e.g., text, images, scripts, video, markup, or other data, may be stored in a content origin data store 130. In some embodiments, the content origin data store 130 is a volume (or "bucket" or "folder" or other storage collection/location) of a storage service that provides data/storage resources (e.g., object storage, block-level storage, data archival storage, databases and database tables, etc.) using non-volatile storage media such as solid-state drives (SSDs). The content origin data store 130 may thus serve as the content source for caching by the POPs 180, though additionally or alternatively, one or more servers 118 (e.g., web servers executed by one or more server computing devices, which may or may not be within the provider network 100) may also act as a data object content source. In some embodiments, the content origin data store 130 and/or server(s) 188 are located within in a region 112 of the provider network 100 (e.g., as a server implemented by a service of the provider network 100 such as a compute instance run by a hardware virtualization service, a function run by a serverless on-demand code execution service, or the like), and/or within one of the POPs 180 or another "edge location", or even within an entirely different network altogether.

A user 102 may initiate a request for content hosted by (or otherwise made accessible by) the provider network 100 by, for example, commanding a web browser application executing on a client electronic device 105 to issue a HyperText Transfer Protocol (HTTP)-based request for a resource, utilizing another type of application that can fetch remote resources via HTTP, etc. Examples of such client electronic devices 105 include personal computers (PCs), cell phones, handheld messaging devices, laptop computers, set-top boxes, personal data assistants, electronic book readers, wearable electronic devices (e.g., glasses, wristbands, monitors), and the like.

As one example, the user 102 may have typed a portion of a Uniform Resource Locator (URL) or, more generally, a Uniform Resource Identifier (URI), including a full or partial domain (e.g., "www.example.com") into the address bar of a browser, clicked on a hyperlink displayed in a browser, opened another type of application, etc.

However, the client electronic device 105 may request a resource responsive to any associated user action, and thus may seek to request a resource on its own, e.g., due to its configuration, based on data it obtains from another source, etc. Thus, in some scenarios a client electronic device 105 could be another type of computing device, such as a server computing device, "smart" device or Internet of Things (IoT) device, etc.

To obtain the resource, the client electronic device 105 may issue a DNS address lookup request that identifies the domain ("www.example.com") to a DNS resolver server, which may be managed by the user's Internet Service Provider (ISP)—such as a cable Internet provider, a DSL broadband provider, or corporate network—or by another entity offering DNS lookup services.

Assuming the DNS resolver server is unaware of the mapping between the provided domain name and a network address associated therewith (e.g., it does not have such a mapping entry in its cache), the DNS resolver server may forward the request (to resolve www.example.com) to a non-illustrated DNS root name server, which may return identifiers of one or more name servers for the top level domain (TLD), and the DNS resolver server may again forward the request to one of the non-illustrated TLD name servers for ".com" domains. The name server for ".com" domains may then respond to the request with the names/network addresses of one or more name servers (e.g., DNS resolver 108) of the DNS service that are associated with the requested "example.com" domain. Thus, the DNS resolver server chooses a name server (e.g., DNS resolver 108) and forwards the request for "www.example.com" to that name server.

Based on receipt of this forwarded request, the DNS resolver 108, at circle (1), may look in the "example.com" hosted zone for the "www.example.com" record, obtain an associated value—such as the IP address (e.g., 192.0.2.44) associated with a POP 180—and return this IP address to the DNS resolver server.

In some cases, this resolution (or identification of an IP address for a domain) may be based on an estimate or approximation of the location of the client electronic device 105 (e.g., using an IP address of the client, when available, or an identifier of the DNS resolver server). Thus, the DNS resolver 108 can provide a network address of an entry point of a POP 180 that can offer the user the best performance (e.g., due to geographic proximity to the client electronic device 105). For example, POP 180A might be located in San Francisco, Calif., whereas POP 180B might be located in Chicago, Ill. Assuming the client electronic device 105 is estimated to be in Oakland, Calif. (or in Northern California, the Bay Area, etc.), the DNS resolver 108 may return a network address associated with POP 180A due to it being more geographically "close" to the inferred or determined location associated with the client. Knowledge of the location of the client can also allow for location compliance, e.g., certain clients in certain geographic locations may or may not be able to access a particular object.

In some embodiments, DNS resolution (e.g., the resolution of a domain name into a network address) is domain-name independent. Requests for any domain name associated with a content delivery system can be responded to with a network address of any POP of the content delivery system. This assumption holds, for example, where all POPs of a content delivery system operate to provide access to any content associated with the content delivery system. Thus, any POP can function to service requests for any content of the content delivery system.

The DNS resolver server now finally has the IP address that the client needs and may return that value to the client electronic device 105. The DNS resolver server may also cache (store) the IP address for "example.com" for some amount of time so that it can respond more quickly the next time a client needs to resolve "example.com."

The client electronic device 105 then may send a request at circle (2) to obtain the resource at "www.example.com" using the network address (e.g., 192.0.2.44) that it resolved, which may correspond to a POP 180A location. Thus, the request is routed via the one or more networks 106 to the corresponding POP 180A, e.g., via one or more routers 104 of intermediate network(s) 106 that have exchanged routing information with POP routers 110A-110N so that they know which POP is associated with which network addresses. The POP 180A may then obtain (from within a cache server 125, intermediate cache 150, or via a data source such as content origin data store 130 and/or server(s) 118) and return the requested resource (e.g., a web page for www.example.com) to the client electronic device 105, which may then act upon the resource (e.g., a web browser displays the page).

Although FIG. 1 illustrates one variant of POP-based resource caching and request fulfillment, other CDN architectures are possible.

Though this system architecture is effective, it can be further improved upon. For example, if a POP 180A is experiencing partial or complete failures (e.g., hardware, software, network, power loss, or other) as shown at circle (3), and those result in the POP 180A being non-reachable or non-responsive to clients, a client utilizing a network address resolved to the POP 180A may experience a service interruption due to requests being sent at circle (4) toward a POP 180A that cannot respond, effectively "black-holing" the traffic sent by the client. The client may then wait for some period of time for a response that will not come, attempt to retry the communications, etc. At some point, assuming the failure condition still exists, the client may give up or attempt to re-resolve the domain to identify a working network address (e.g., as shown at circle (5)), though this cannot be guaranteed to remedy the problem as some intermediate entity may have cached the previously-resolved but now non-functional address (e.g., a DNS server of an ISP) and return this same non-functional address. Alternatively, the DNS resolver 108 may not know that the POP 180A is experiencing failures (such as when a problem is between the "edge" of the POP and an external network making the POP unreachable to the internet, though still connected through a separate link to the provider network) and similarly may return a same network address for the same impaired POP. Thus, the client remains without service while waiting for the problems to be resolved, and/or the CDN 114 to detect/confirm the problem and update the DNS resolver 108 to no longer resolve to addresses associated with a problematic POP. It may thus take some amount of time for the client to obtain a new network address associated with a functional POP, which it can then use, at circle (6), to obtain their desired resources.

Figure 3:
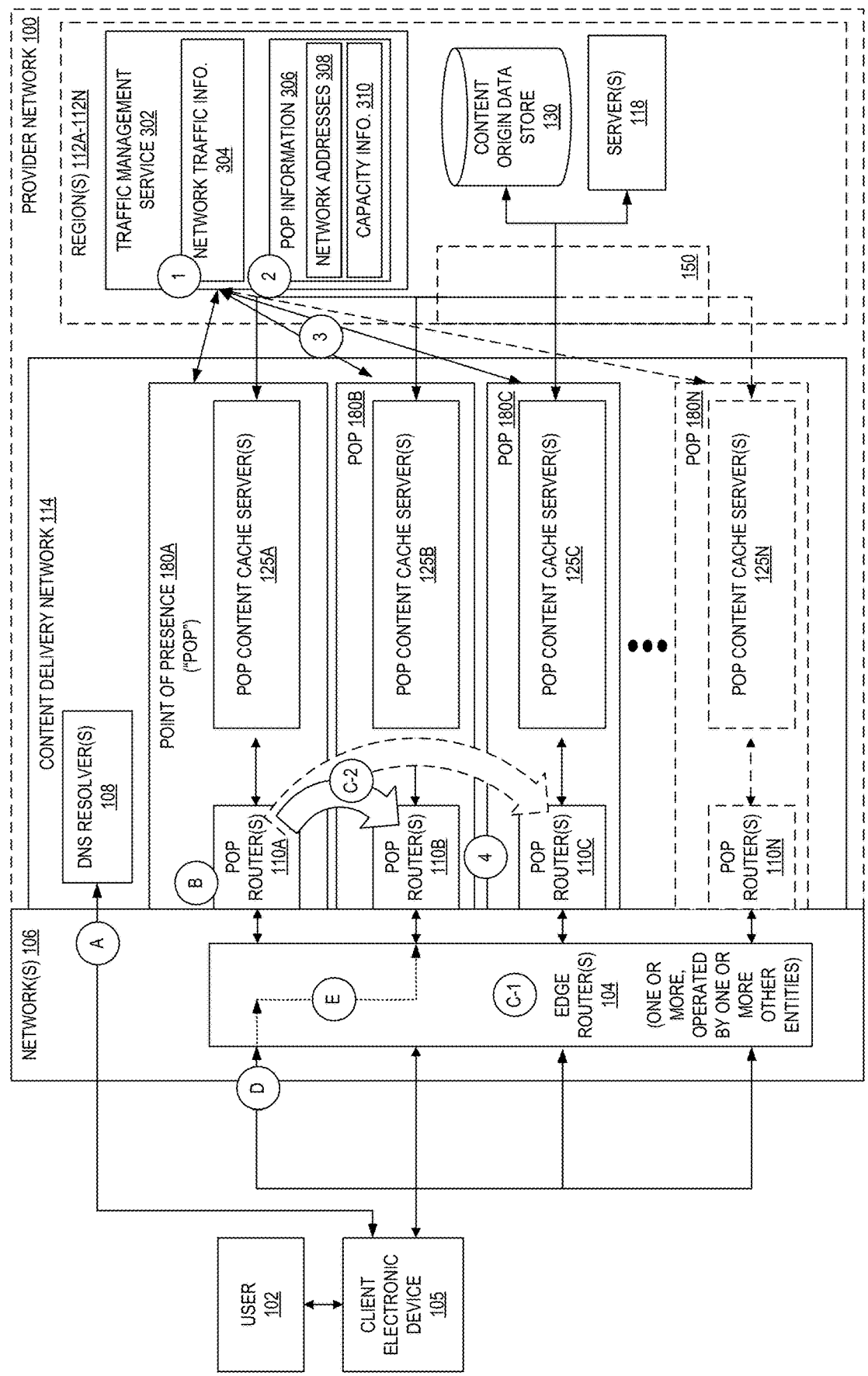
FIG. 3 is a diagram illustrating techniques for rapid POP failure handling for a CDN network according to some embodiments.

Embodiments disclosed herein can proactively plan for and accommodate such failure scenarios and may allow for a smooth failover to be made in a comparatively much smaller amount of time. FIG. 3 is a diagram illustrating techniques for rapid POP failure handling for a CDN network according to some embodiments. In FIG. 3, a traffic management service 302 may monitor POP network traffic utilization and, based on POP resource capacity information, configure POP routers 110 to advertise "redundant" routes via a routing protocol so that upon a failure associated with a POP, neighboring networks/edge routers 104 (e.g., of another entity) can detect the issue and almost immediately redirect traffic destined to an affected IP address to another POP where the traffic can be successfully served.

The traffic management service 302 may be implemented using software executed by one or more computing devices, as computing hardware, or as a combination of both. In some embodiments, the traffic management service 302 is implemented in a centralized manner, though in other embodiments the traffic management service 302 is implemented in a distributed manner using multiple computing devices in one or multiple locations.

In some embodiments, the traffic management service 302 obtains at circle (1) network traffic information 304 describing current, recent, and/or historic network traffic associated with the POPs 180, such as the number and/or rate of requests sent to the POPs, the number and/or rate responses sent by the POPs, the average or total bandwidth flowing into or out of the POPs, the number of unique clients, and the like. This can be instrumented in a variety of ways known to those of skill in the art. For example, in some embodiments each POP 180 generates and sends traffic logs (or summaries thereof) to a monitoring/logging service of the provider network on a periodic basis (e.g., every five minutes, hourly, etc.) and the traffic management service 302 obtains this network traffic information 304 from the monitoring/logging service. In some embodiments, traffic monitoring agents deployed in the POPs 180 collect and send back network traffic information to a storage location (e.g., provided by an object storage service of the provider network) or directly to the traffic management service 302. In other embodiments, the traffic management service 302 may communicate with each of the POPs 180 to obtain network logs from a server deployed therein.

With the network traffic information 304, the traffic management service 302 may also utilize a database/collection of POP information 306 to determine which IP addresses associated with a particular POP are to be shifted (in the event of a failure impacting that POP) to which other POPs. This POP information 306 may include, for example, a list of network addresses 308 (e.g., IP addresses) are used by or assigned to each POP 180, and capacity information 310 indicating how much capacity—e.g., requests per unit of time, bandwidth per unit of time, etc.—a particular POP can handle.

Figure 4:
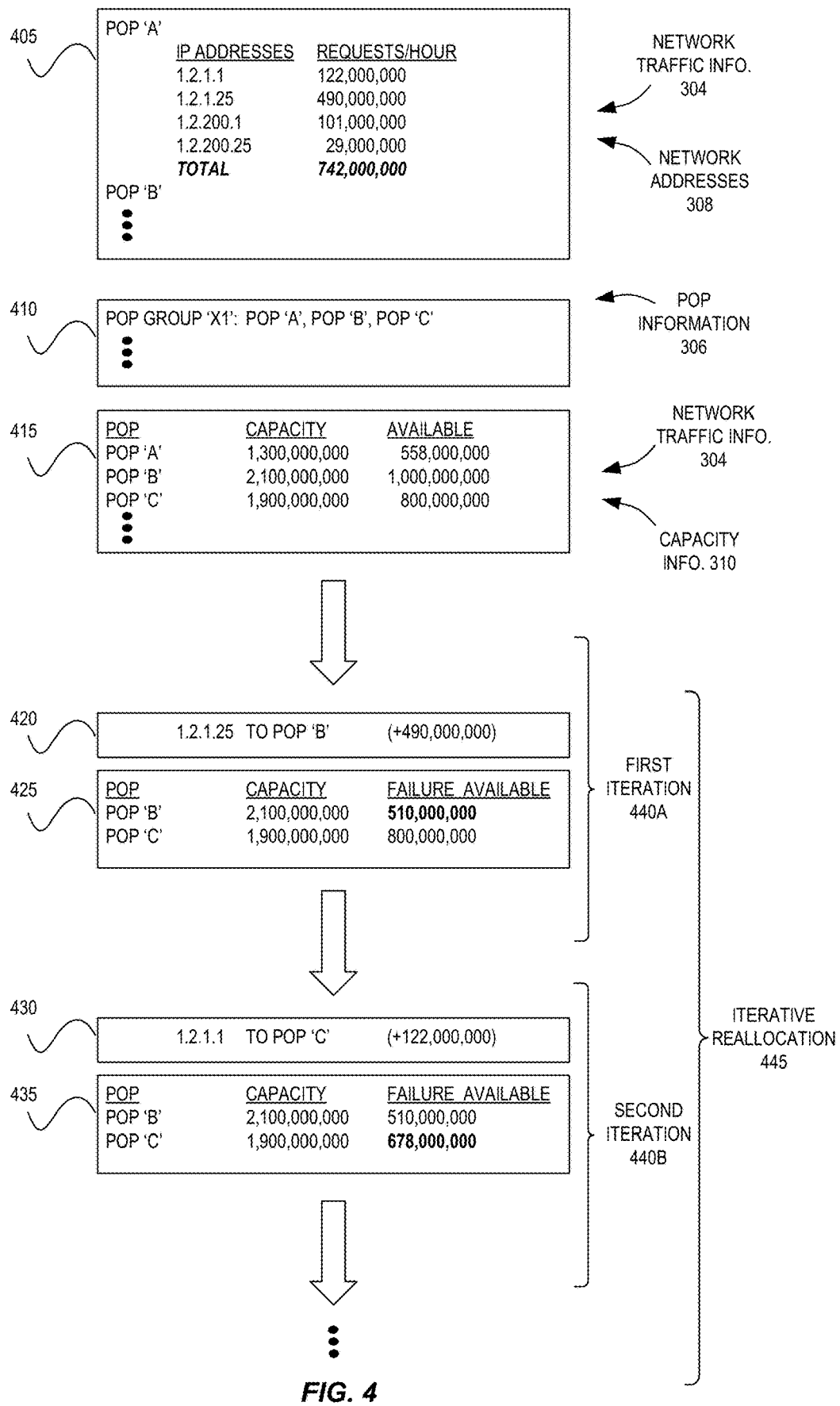
FIG. 4 is a diagram illustrating POP traffic apportionment for rapid POP failure handling for a CDN network according to some embodiments.

An example processing scheme is shown in FIG. 4, which is a diagram illustrating POP traffic apportionment for rapid POP failure handling for a CDN network according to some embodiments. This traffic apportionment process can be performed, for example, by the traffic management service 302 of the other figures. In this figure, a simple example for apportioning traffic associated with specific network addresses (e.g., IPv4 addresses, such as "1.2.1.25") is shown; however, it is to be understood that other embodiments can perform these and similar apportionment processes using address prefixes (that is, blocks of addresses), different types of network addresses (e.g., IPv6 addresses), etc.

The process may utilize the network traffic information 304 and the set of network addresses 308 to identify data 405 indicating, for each POP, a set of network addresses utilized within the POP along with recent network traffic characteristics, here shown as a number of requests per hour sent to the respective POP.

The process may also utilize a set of POP information 306 to yield data 410, indicating which POPs are in a "group" of POPs that can be used to redirect traffic between themselves. For example, for an analyzed POP 'A' that belongs to a group along with a POP 'B' and a POP 'C', traffic destined to its network addresses may be sent, during a failure associated with POP 'A', to either POP 'B', POP 'C', or both POP 'B' and POP 'C' in some manner as described later herein. Thus, other POPs—e.g., a POP 'X'—perhaps may not be included. In some embodiments, all POPs in a CDN may be available for such traffic reassignment, though, and in some embodiments a specific set of POPs are also made available for reassignments (e.g., a POP deployed within a provider network, or some number of nearby POPs, such as when a POP under consideration is not explicitly part of a POP group).

The traffic apportionment process may also utilize the network traffic information 304 and capacity information 310 to identify data 425 indicating, for each POP, a capacity of that POP (in this example, reflected in a total number of requests per hour) together with a "remaining" capacity (or "available" capacity) of the POP, here reflecting the difference between the capacity and the current utilization as reflected in data 405—e.g., POP 'A' has an available amount of 558,000,000, reflecting the difference between its capacity of 1,300,000,000 and the total current utilization (via data 405) of 742,000,000.

With this information, a reallocation procedure can be performed to assign ones of these network addresses to be handled by other POPs in the event of a failure. Various techniques could be used for this purpose that are known or derivable by those of skill in the art, though FIG. 4 shows one greedy algorithm approach using an iterative reallocation 445. In this shown iterative reallocation 445 process, a "largest" IP address—in terms of current utilization and/or predicated utilization (optionally generated by a statistical or machine learning model based on previous data)—is reassigned to another POP first, followed by the next largest IP address, and so on.

In this example, in the first iteration 440A a first IP address (here, 1.2.1.25) is identified in data 420 as being the largest non-reallocated address due to its current requests/hour, per data 405, being the largest amongst those of POP 'A'. In this case, this address is allocated to the POP within the same group as POP 'A' having a largest available capacity—here, POP 'B' is selected, and its "failure case available capacity" is updated in data 425 by subtracting the utilization of the IP address (490,000,000) from the previous available capacity of POP 'B' (of 1,000,000,000), resulting in a remaining free capacity of 510,000,000, assuming a failure associated with POP 'A'.

The process may then continue with a second iteration 440B, in which a second largest IP address (in terms of utilization) is selected—here, shown as 1.2.1.1 in data 430—and assigned to the POP in the group having a largest remaining capacity, which here is POP 'C' (because 800,000,000 is larger than 510,000,000, per data 425). Thus, the failure case available capacity is updated in data 435 by subtracting the utilization of the IP address (122,000,000) from the previous available capacity of POP 'C' (of 800,000,000), resulting in a remaining free capacity of 678,000,000, assuming a failure associated with POP 'A'.

This process continues until all network addresses used within POP 'A' are reassigned, or until no POP exists in the group that can satisfy any remaining network addresses. In some embodiments, remaining network addresses may simply be ignored (as they reflect a smallest set of traffic), but in other embodiments these network addresses may be reallocated to other, "nearby" (in terms of geography or network/latency distance) POPs, to a POP deployed within a region of the provider network, or the like.

In some embodiments, this process is repeated for all POPs in the CDN and may be performed on a periodic basis—e.g., every five minutes, sixty minutes, twelve hours, or the like.

Turning back to FIG. 3, having determined which POPs will serve as "backup" POPs for other POPs in the event of a failure, the traffic management service 302 may configure the POPs accordingly to implement this determined setup. For example, in some embodiments the traffic management service 302 transmits commands at circle (3) to a networking service (e.g., a controller) or directly to POP routers 110A-110N at the POPs 180A-180N to cause these POP routers 110 to advertise redundant routes, at circle (4), that will be initially ignored by other peered routers 104 but will be utilized by those routers 104 in the event of a failure. For example, if a client electronic device 105 resolves a particular domain to a network address at circle (A) that is associated with POP 180A, and if a partial or complete failure impacts this POP 180A at circle (B), the edge routers 104 in the adjacent network(s) 106 can quickly detect the lack of responsiveness on the part of the POP router(s) 110A, and can recompute new routes at circle (C-1) for the affected network addresses that flow to one or more of the other POPs 108B-108N (at circle (C-2), per the reallocation scheme presented above) which can service these requests due to the domain-name independence of the CDN (where any POP can service requests for a domain). Thus, a request issued by the client electronic device 105 at circle (D) using the previously resolved IP address utilized by POP 180A will instead be routed by the network(s) 106 to another POP— here, shown as POP 180B—and serviced within that POP without the client electronic device 105 even becoming aware of the failure and/or re-routing of the request.

Figure 5:
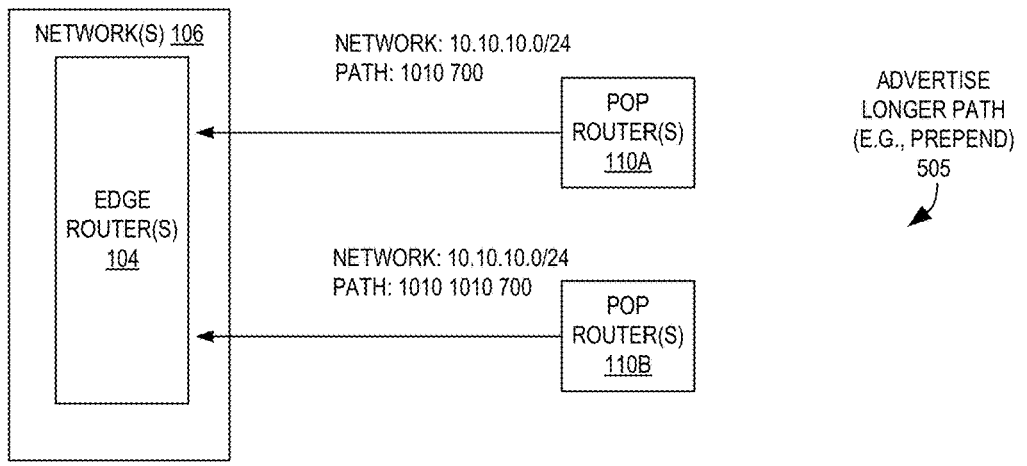
FIG. 5 is a diagram illustrating exemplary routing techniques useful in rapid POP failure handling for a CDN network according to some embodiments.
Figure 5:
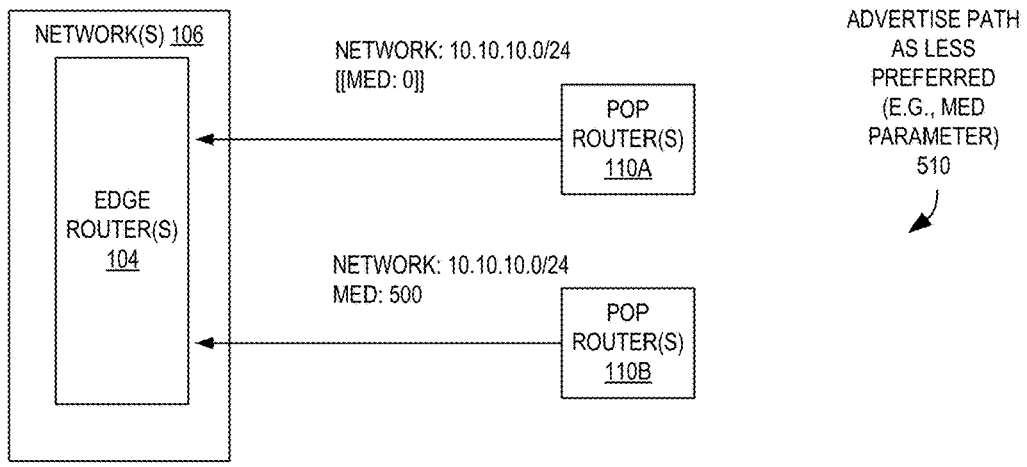
Figure 5:
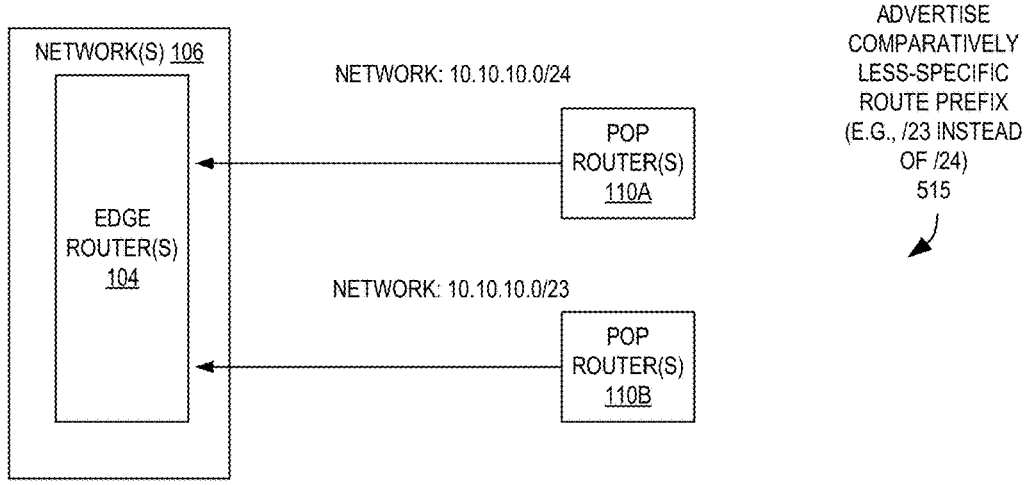

The traffic management service 302 may use a variety of techniques to cause the POP routers 110 to advertise redundant routes that will be initially ignored but become active upon a failure. For example, FIG. 5 is a diagram illustrating several exemplary routing techniques useful in isolation or in combination for rapid POP failure handling for a CDN network according to some embodiments. These techniques could be applied using a routing protocol such as the Border Gateway Protocol (BGP), for example, though similar techniques can be applied for other routing protocols.

For example, as shown at the top of FIG. 5, a router may advertise a "longer" path 505 for a particular network address or block of network addresses. A simple example is shown in which a first POP router 110A may advertise a path to a /24 block including two "hops" as shown by autonomous system (AS) numbers "1010" and "700." This acts as a "active" path, and thus the edge routers 104 will use it to route traffic to addresses of the address block 10.10.10.0/24. However, the POP router 110B of a POP that is determined to be a failover POP for this block may be configured to advertise the same route, though instead with an artificially "longer" path (as shown, "1010" and "1010" and "700") such that the edge routers 104 will deem it to be less preferred than the path advertised by POP router(s) 110A. This can be implemented using a BGP as-prepend path attribute, in which one or more autonomous system (AS) numbers are prepended at the beginning of an AS path of a route. The AS numbers may be added at the beginning of the path after the actual AS number from which the route originates has been added to the path. Prepending an AS path makes a shorter AS path look longer and therefore less preferable.

This technique works because the BGP best path algorithm, which determines how the best path to an AS is selected, determines the best path based on the path length when (i) there are multiple potential routes to an AS, (ii) BGP has the lowest preference value (sometimes referred to as administrative distance) of the available routes, and (iii) the local preferences of the available routes are equal. When these conditions are met, the AS path length is used as the tie breaker in the best path algorithm. When two or more routes exist to reach a particular prefix, BGP prefers the route with the shortest AS Path length. Thus, when both paths are valid, the "primary" path advertised by the POP router(s) 110A will be used as long as the POP is responsive; when it fails, that path is removed and thereafter the redundant path advertised by the POP router(s) 180B is used, causing the traffic to be sent to and processed by the failover POP.

As another example, as shown in the middle of FIG. 5, a POP router may advertise a route with a designation that explicitly indicates that it is less preferred 510 in some manner, e.g., via use of a Multi Exit Discriminator (MED) parameter value. In this manner, a BGP attribute is used to explicitly set the preference of the route itself. The MED value is an optional nontransitive attribute that acts as a hint to external neighbors about the preferred path into an AS that has multiple entry points. The MED is also known as the external metric of a route. A lower MED value is preferred over a higher value.

In this environment, the failover POP's POP router 110B—despite not offering an alternate route to a same server, does offer an alternate route to a same resource—and can advertise a route with a higher MED value (here, "500") than that of the primary route advertised by the primary POP's router, which may not be provided (as a value of "0" is default/inferred) or explicitly provided.

As yet another example, as shown at the bottom of FIG. 5, a failover POP's router may advertise a comparatively less-specific route prefix 515 than that of the primary POP's router. In some routing scenarios, such as in BGP-based schemes, a best path algorithm may select a path to a network address that has a most-specific route prefix. Thus, as shown in FIG. 5, if a primary POP's router advertises a "/24" prefix (including addresses 10.10.10.0 to 10.10.10.255, also referred to as a class C block), the failover POP's router could advertise a less-specific "/23" prefix (including twice as many addresses) when the CDN is in possession of this block and can route all requests coming via the network(s) 106 to that POP. Accordingly, when in possession of both advertised routes, the router(s) 104 would use the more specific "/24" path when possible, and fallback to the "/23" path when a failure occurs.

In some embodiments, multiple ones of these approaches are combined—e.g., both a less-specific prefix 515 is advertised together with a less preferred parameter 510—providing an additional layer of protection to ensure that a failover route is not used until needed, as it may be the case that a software and/or hardware bug/error could fail one of these techniques.

Figure 6:
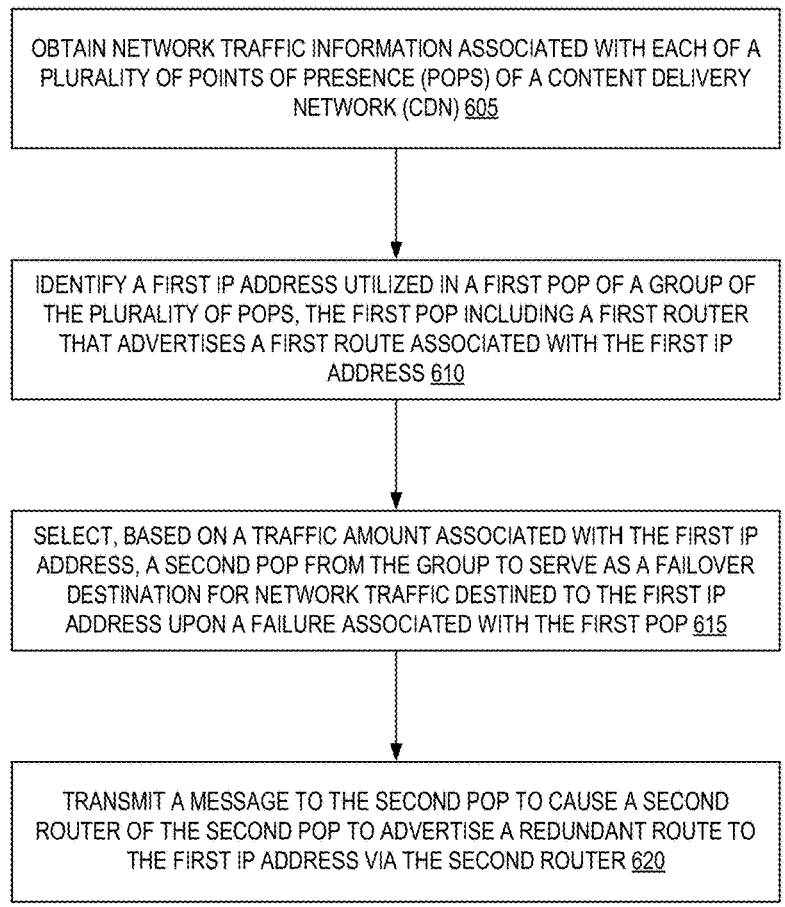
FIG. 6 is a flow diagram illustrating operations of a method for rapid POP failure handling for CDN networks according to some embodiments.

FIG. 6 is a flow diagram illustrating operations of a method for rapid POP failure handling for CDN networks according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the traffic management service 302 of the other figures.

The operations 600 include, at block 605, obtaining network traffic information associated with each of a plurality of points of presence (POPs) of a content delivery network (CDN).

At block 610 the operations 600 include identifying a first IP address utilized in a first POP of a group of the plurality of POPs, the first POP including a first router that advertises a first route associated with the first IP address.

The operations 600 include, at block 615, selecting, based on a traffic amount associated with the first IP address, a second POP from the group to serve as a failover destination for network traffic destined to the first IP address upon a failure associated with the first POP. In some embodiments, block 615 includes determining that the second POP has a bandwidth availability amount that is greater than or equal to the traffic amount associated with the first IP address.

At block 620 the operations 600 include transmitting a message to the second POP to cause a second router of the second POP to advertise a redundant route to the first IP address via the second router.

In some embodiments, the second router advertises the redundant route via a Border Gateway Protocol (BGP) session. In some embodiments, the second router advertises the redundant route by: prepending one or more autonomous system (AS) values to an AS path of the redundant route that is associated with the first IP address.

In some embodiments, the second router advertises the redundant route with a multi-exit discriminator (MED) value causing the redundant route to be less preferred than the first route by other routers.

In some embodiments, the second router advertises the redundant route with a less specific route prefix than the route prefix of the first route. In some embodiments, the less specific route prefix of the redundant route is between a /8 and /23 prefix, inclusive; and the route prefix of the first route is between a /24 and /32 prefix, inclusive.

In some embodiments, the second router advertises the redundant route with a MED value causing the redundant route to be less preferred than the first route by other routers, and also with a less specific route prefix than the route prefix of the first route.

In some embodiments, the operations 600 further include identifying a second IP address utilized in the first POP; selecting, based on another traffic amount associated with the second IP address, a third POP from the group to serve as a failover destination for network traffic destined to the second IP address upon a failure associated with the first POP; and transmitting a message to the third POP to cause a third router of the third POP to advertise another redundant route to the second IP address via the third router. In some embodiments, the first route advertises a single route prefix encompassing both the first one or more IP addresses and also the second one or more IP addresses; the redundant route advertised by the second router advertises a second route prefix encompassing at least the first one or more IP addresses; and the another redundant route advertised by the third router advertises a third route prefix encompassing at least the second one or more IP addresses In some embodiments, blocks 610 and 615 are part of a greedy IP address assignment process, the greedy IP address assignment process comprising one or more iterations of: identifying an IP address, utilized in the first POP, that has not been processed in the greedy IP address assignment process and that has a highest traffic amount among unprocessed IP addresses utilized in the first POP; and selecting a POP from the group of POPs having a largest remaining bandwidth availability amount.

In some embodiments, the operations 600 are all performed by a content distribution network (CDN) traffic management service that is geographically separate from the plurality of POPs.

Figure 7:
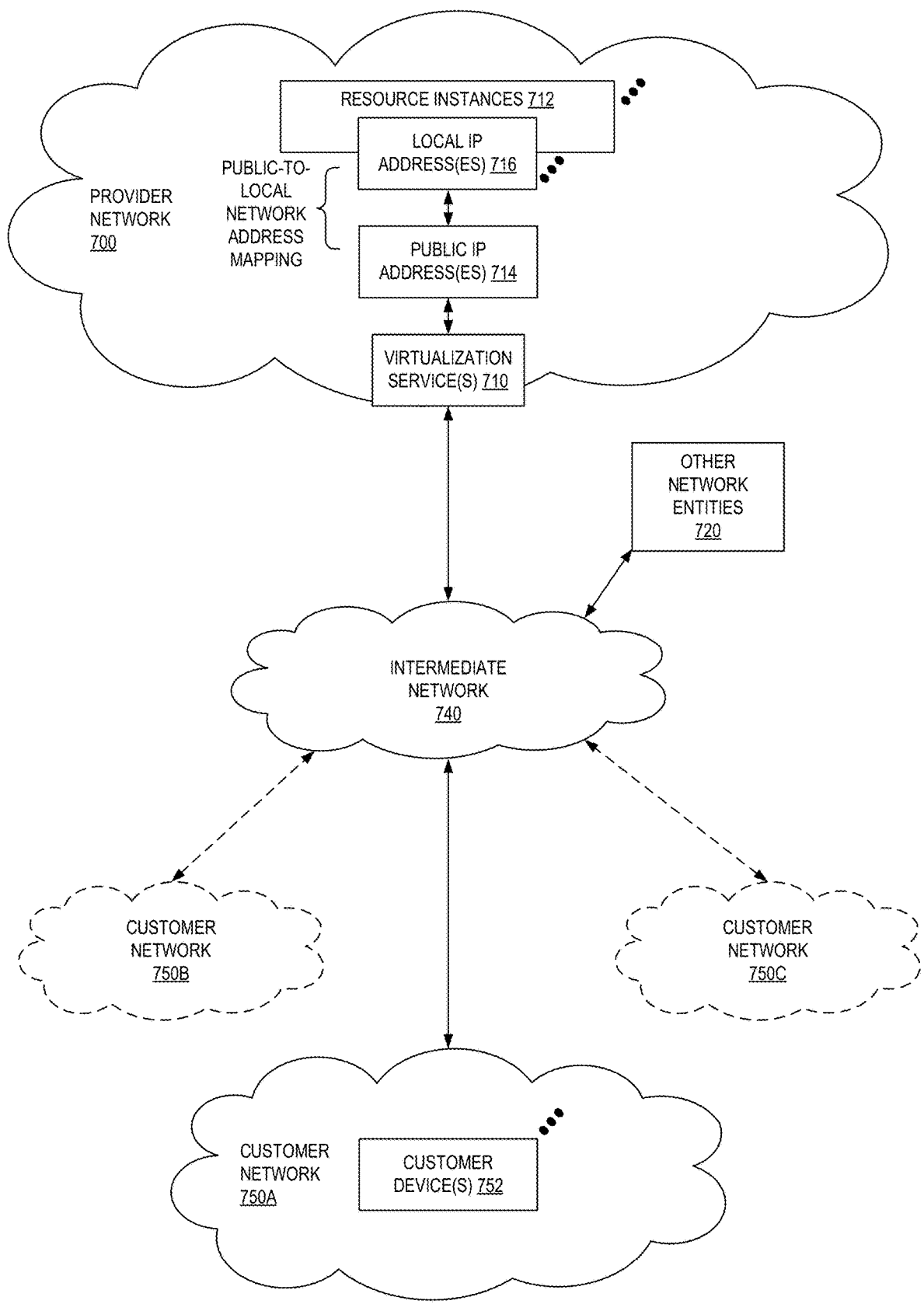
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
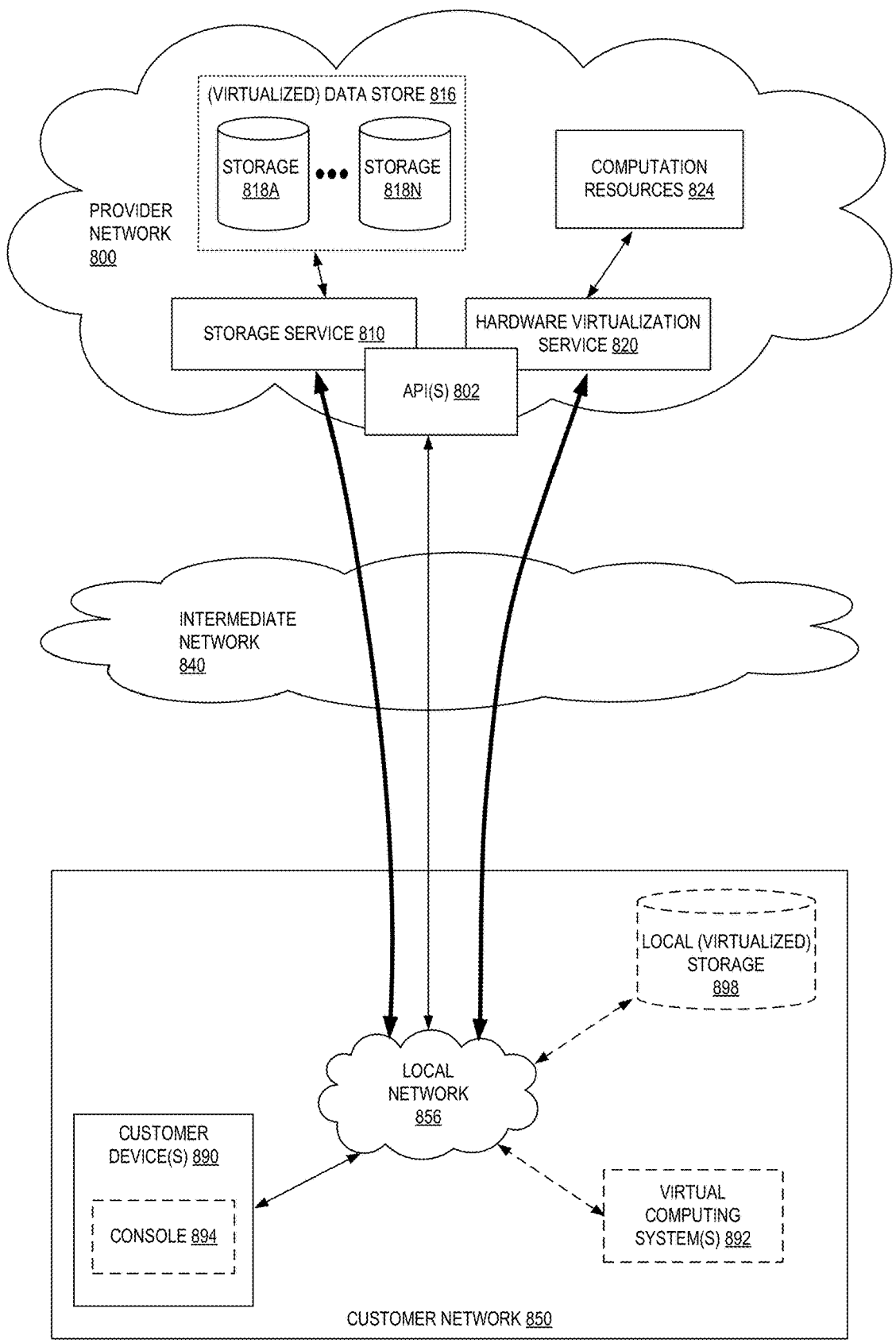
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative Systems

Figure 9:
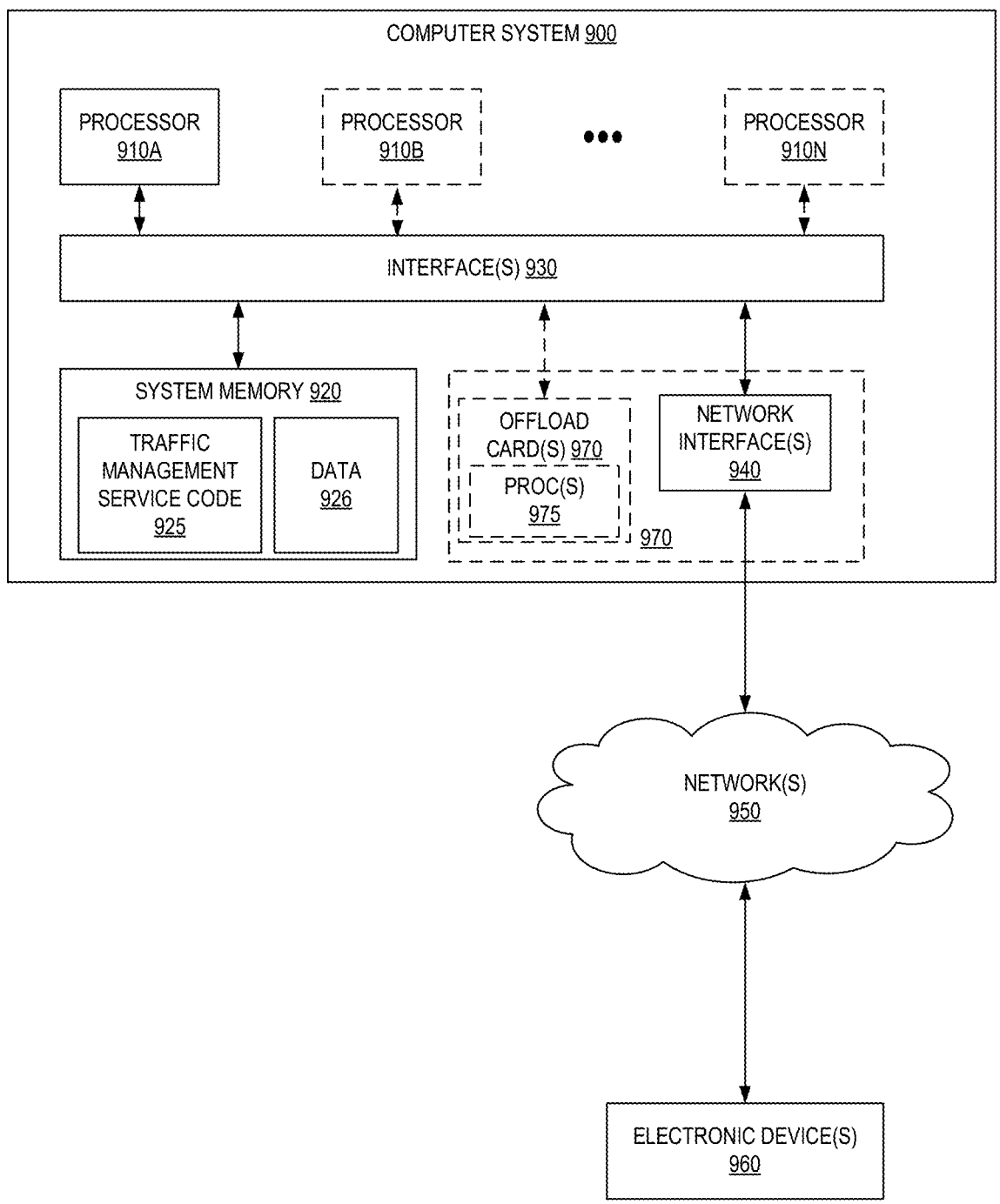
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as traffic management service code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    obtaining network traffic information associated with each of a plurality of points of presence (POPs) of a content delivery network (CDN), wherein each of the plurality of POPs includes one or more caching servers and at least a router, the network traffic information for each of the plurality of POPs comprising network traffic summary data involving traffic received at the corresponding router from outside the POP that is destined to one or more Internet Protocol (IP) addresses utilized within the POP;
    identifying a first block of one or more IP addresses utilized in a first POP of a group of the plurality of POPs, wherein a first router of the first POP advertises a first route associated with the first block of IP addresses;
    selecting, based on a traffic amount associated with the first block of IP addresses, a second POP from the group to serve as a failover destination for network traffic destined to the first block of IP addresses upon a failure associated with the first POP;
    transmitting a message to the second POP to cause a second router of the second POP to advertise a redundant route to the first block of IP addresses via the second router of the second POP;
    identifying a second block of one or more IP addresses utilized in the first POP;
    selecting, based on a traffic amount associated with the second block of IP addresses, a third POP from the group to serve as a failover destination for network traffic destined to the second block of IP addresses upon a failure associated with the third POP; and
    transmitting a message to the third POP to cause a third router of the third POP to advertise a redundant route to the second block of IP addresses via the third router of the third POP.

2. The computer-implemented method of claim 1, wherein identifying the first block of IP addresses and selecting the second POP to serve as the failover destination for network traffic destined to the first block of IP addresses is part of a greedy IP address assignment process, the greedy IP address assignment process comprising one or more iterations of:
    identifying a block of IP addresses, utilized in the first POP, that has not been processed in the greedy IP address assignment process and that has a highest traffic amount among a set of unprocessed blocks of IP addresses utilized in the first POP; and
    selecting a POP from the group of POPs having a largest remaining bandwidth availability amount.

3. The computer-implemented method of claim 1, wherein the second router of the second POP is to advertise the redundant route to the first block of IP addresses by one or more of:
    advertising the redundant route with one or more autonomous system (AS) values prepended to an AS path of the first route;
    advertising the redundant route with a multi-exit discriminator (MED) value causing the redundant route to be less preferred than the first route by other routers; or
    advertising the redundant route with a less specific route prefix than the route prefix of the first route.

4. A computer-implemented method comprising:
    obtaining network traffic information associated with each of a plurality of points of presence (POPs) of a content delivery network (CDN);
    identifying a first one or more Internet Protocol (IP) addresses utilized in a first POP of a group of the plurality of POPs, the first POP including a first router that advertises a first route associated with the first one or more IP addresses;
    selecting, based on a traffic amount associated with the first one or more IP addresses, a second POP from the group to serve as a failover destination for network traffic destined to the first one or more IP addresses upon a failure associated with the first POP; and
    transmitting a message to the second POP to cause a second router of the second POP to advertise a redundant route to the first one or more IP addresses via the second router of the second POP.

5. The computer-implemented method of claim 4, wherein the second router of the second POP advertises the redundant route via a Border Gateway Protocol (BGP) session.

6. The computer-implemented method of claim 5, wherein the second router of the second POP advertises the redundant route by:
    prepending one or more autonomous system (AS) values to an AS path of the redundant route that is associated with the first one or more IP addresses.

7. The computer-implemented method of claim 5, wherein the second router of the second POP advertises the redundant route with a multi-exit discriminator (MED) value causing the redundant route to be less preferred than the first route by other routers.

8. The computer-implemented method of claim 5, wherein the second router of the second POP advertises the redundant route with a less specific route prefix than the route prefix of the first route.

9. The computer-implemented method of claim 4, further comprising:
    identifying a second one or more IP addresses utilized in the first POP;

selecting, based on another traffic amount associated with the second one or more IP addresses, a third POP from the group to serve as a failover destination for network traffic destined to the second one or more IP addresses upon a failure associated with the first POP; and transmitting a message to the third POP to cause a third router of the third POP to advertise another redundant route to the second one or more IP addresses via the third router of the third POP.

10. The computer-implemented method of claim 9, wherein:
   the first route advertises a single route prefix encompassing both the first one or more IP addresses and also the second one or more IP addresses;
   the redundant route advertised by the second router of the second POP advertises a second route prefix encompassing at least the first one or more IP addresses; and
   the another redundant route advertised by the third router of the third POP advertises a third route prefix encompassing at least the second one or more IP addresses.

11. The computer-implemented method of claim 4, wherein selecting, based on the traffic amount associated with the first one or more IP addresses, the second POP from the group to serve as the failover destination comprises:
   determining that the second POP has a bandwidth availability amount that is greater than or equal to the traffic amount associated with the first one or more IP addresses.

12. The computer-implemented method of claim 4, wherein identifying the first one or more IP addresses and selecting the second POP to serve as the failover destination for network traffic destined to the first one or more IP addresses is part of a greedy address assignment process, the greedy address assignment process comprising one or more iterations of:
   identifying one or more IP addresses, utilized in the first POP, that have not been processed in the greedy address assignment process and that has a highest traffic amount among unprocessed IP addresses utilized in the first POP; and
   selecting a POP from the group of POPs having a largest remaining bandwidth availability amount.

13. The computer-implemented method of claim 4, wherein the second router of the second POP advertises the redundant route with a multi-exit discriminator (MED) value causing the redundant route to be less preferred than the first route by other routers, and also with a less specific route prefix than the route prefix of the first route.

14. The computer-implemented method of claim 4, wherein the obtaining network traffic information, the identifying the first IP address, the selecting of the second POP, and the transmitting of the message to the second POP are all performed by a content distribution network (CDN) traffic management service that is geographically separate from the plurality of POPs.

15. A system comprising:
   a first one or more electronic devices to implement a first router at a first point of presence (POP) of a content delivery network (CDN), the first POP further including a first one or more caching servers, the first router of the first POP advertising a first route associated with at least a first Internet Protocol (IP) address;
   a second one or more electronic devices to implement a second router at a second POP of the CDN, the second POP further including a second one or more caching servers; and
   a third one or more electronic devices to implement a traffic management service, the traffic management service including instructions that upon execution cause the traffic management service to:
      obtain network traffic information associated with each of a plurality of POPs, the plurality of POPs including the first POP and the second POP;
      identify the first IP address as being utilized in the first POP;
      select, based on a traffic amount associated with the first IP address, the second POP to serve as a failover destination for network traffic destined to the first IP address upon a failure associated with the first POP; and
      transmit a message to the second POP to cause the second router of the second POP to advertise a redundant route to the first IP address via the second router of the second POP.

16. The system of claim 15, wherein the second router of the second POP advertises the redundant route via a Border Gateway Protocol (BGP) session.

17. The system of claim 16, wherein the second router of the second POP is to advertise the redundant route by:
   prepending one or more autonomous system (AS) values to an AS path of the redundant route that is associated with the first IP address.

18. The system of claim 16, wherein the second router of the second POP is to advertise the redundant route with a multi-exit discriminator (MED) value causing the redundant route to be less preferred than the first route by other routers.

19. The system of claim 16, wherein the second router of the second POP is to advertise the redundant route with a less specific route prefix than the route prefix of the first route.

20. The system of claim 15, wherein the instructions upon execution further cause the traffic management service to:
   identify a second IP address utilized in the first POP;
   select, based on another traffic amount associated with the second IP address, a third POP to serve as a failover destination for network traffic destined to the second IP address upon a failure associated with the first POP; and
   transmit a message to the third POP to cause a third router of the third POP to advertise a redundant route to the second IP address via the third router of the third POP.

* * * * *